2,975,028
PHOSPHORUS COMPOUNDS AND PROCESS FOR MAKING

Gerhard Barth-Wehrenalp, Elkins Park, and Alexander Kowalski, Levittown, Pa., assignors to Pennsalt Chemicals Corporation, a corporation of Pennsylvania No Drawing. Filed Feb. 15, 1956, Ser. No. 565,551

13 Claims. (Cl. 23—14)

This invention relates to addition compounds of monomeric phosphonitrilic halides with phosphorus pentahalides and to a novel process for producing such compounds.

The chemistry of the phosphonitrilic chlorides and some of their derivatives has been described by Audrieth, Steinman and Toy in Chemical Reviews, vol. 32, pages 109-33 (February 1943). The compounds there involved are based on the polymers of phosphonitrilic chloride. The trimer and other polymers are shown to form when ammonium chloride is reacted with phosphorus pentachloride.

It has now unexpectedly been found that when an ammonium halide and a phosphorus pentahalide are reacted in the presence of a phosphorus oxyhalide a novel compound is formed which has been identified as the addition compound of monomeric phosphonitrilic halide with phosphorus pentahalide.

The new compounds which can be prepared by the practice of this invention have the structural formula $PNX \cdot 2PX_5$, in which X is any halogen, e.g. chlorine, bromine, iodine or fluorine, or any combination thereof.

The phosphorus oxyhalide is believed to serve as an intermediate for the formation of the phosphorus oxyhalide addition compound of phosphonitrilic halide, $PNX_2 \cdot POX_3$, which in turn reacts with the phosphorus pentahalide to form $PNX_2 \cdot 2PX_5$, the product of this invention. The following series of reactions are postulated, using chlorine, for example, as the halogen of the halides:

$PCl_5 + NH_4Cl \rightarrow PNCl_2 + 4HCl$
$PNCl_2 + POCl_3 \rightarrow PNCl_2 \cdot POCl_3$
$PNCl_2 \cdot POCl_3 + 2PCl_5 \rightarrow PNCl_2 \cdot 2PCl_5 + POCl_3$

$3PCl_5 + NH_4Cl + POCl_3 \rightarrow PNCl_2 \cdot 2PCl_5 + POCl_3 + 4HCl$

For the most part the phosphorus oxyhalide is recovered in practically the same amount as is charged to the reaction. A small amount of phosphorus oxyhalide-phosphonitrilic halide is also recovered from the reaction, and accounts for the unrecovered $POX_3$.

The compounds of this invention are prepared by reacting an ammonium halide with a phosphorus pentahalide in an excess of phosphorus oxyhalide, the halide in each case being a halogen selected to give the halogens desired in the product. The compounds may also be prepared by the reaction of a phosphorus pentahalide with a compound of the structure $PNX_2 \cdot POX_3$, in which X is any halogen, and which is formed as a by-product in the primary reaction. Compounds having the empirical formula $P_2X_5NO$ and the probable structure $PNX_2 \cdot POX_3$ and a new process for their preparation are the subject of a copending application Ser. No. 565,974 filed in the name of E. Jack Kahler on February 16, 1956, now Patent No. 2,925,320.

The compound $PNCl_2 \cdot 2PCl_5$ is representative of the class of compounds $PNX_2 \cdot 2PX_5$, where X is a halogen as defined above, and, for purposes of illustration, the process and product are described in more detail with respect to this compound. In the production of $PNCl_2 \cdot 2PCl_5$, phosphorus pentachloride and ammonium chloride are reacted in the presence of phosphorus oxychloride. The reaction can also be carried out in the additional presence of a halogenated hydrocarbon solvent, a preferred one being sym-tetrachloroethane. When a solvent is used, about two parts by weight of solvent are preferably used to one part total of reactants, but the amount of solvent used is not critical.

The reactants are mixed together and the reactant mass is heated to about 50° C. to begin the reaction. The temperature is then raised and maintained between about 80° and about 120° C. until evolution of by-product hydrogen chloride gas becomes negligible. The reaction mass is then treated with a hot inert organic solvent, sym-tetrachloroethane is preferred, to extract the product. The solvent solution is filtered and then evaporated. The solvent-free mass is next heated under vacuum to about 130° C. to remove unreacted $PCl_5$ and $POCl_3$ and a by-porduct material, $PNCl_2 \cdot POCl_3$. The product, $PNCl_2 \cdot 2PCl_5$, remains in the evaporator and is recovered as a mass of crystals therefrom. The $PNCl_2 \cdot 2PCl_5$ may be recrystallized to a higher state of purity using sym-tetrachloroethane, for example, as a solvent.

The by-product material, $PNCl_2 \cdot POCl_3$, may be reacted with $PCl_5$ to form more $PNCl_2 \cdot 2PCl_5$. The same reaction can be carried out using $PNCl_2 \cdot POCl_3$ prepared by other means and reacting it with phosphorus pentachloride. The reaction may be carried out either in the presence of an inert organic solvent or in the absence of such solvent; however, the reaction proceeds more rapidly in the absence of a solvent, and the latter method is preferred. When a solvent is used, sym-tetrachloroethane is preferred. The reaction is carried out essentially in the same manner as described above for the preparation of $PNCl_2 \cdot 2PCl_5$ from $PCl_5$, $POCl_3$ and $NH_4Cl$.

In practicing this invention, the reactants are used in the proportion of about three moles of phosphorus pentahalide to at least one mole of ammonium halide to at least one mole of phosphorus oxyhalide. The presence of the phosphorus oxyhalide is necessary, as discussed above, for the reaction between the ammonium halide and the phosphorus pentahalide to proceed to the product of this invention, $PNX_2 \cdot 2PX_5$.

For the conversion of $PNX_2 \cdot POX_3$ to $PNX_2 \cdot 2PX_5$, about two moles of phosphorus pentahalide are used to at least one mole of $PNX_2 \cdot POX_3$.

The reaction for the formation of $PNX_2 \cdot 2PX_5$, from either the primary raw materials described above, as well as from $PNX_2 \cdot POX_3$ may be carried out at temperatures ranging from about 50° to about 120° C. The time for the reaction to run to completion, as indicated by the ending of the evolution of hydrogen halide gas from the reaction, may be from about 24 hours at a temperature of about 50-60° C. to about 30 minutes at higher temperatures of 100-120° C. In general, the preferred time and temperature condiitons for carrying out the reaction between ammonium halide and phosphorus pentahalide in the presence of phosphorus oxyhalide, are a period of 2 to 4 hours and a temperature of about 80 to about 100° C. Similar conditions are preferred for the reaction of $PNX_2 \cdot POX_3$ with phosphorus pentahalide to form $PNX_2 \cdot 2PX_5$.

In carrying out the reaction, as above stated, three moles of phosphorus pentahalide are reacted with at least one mole of ammonium halide in the presence of at least one mole of phosphorus oxyhalide. In a preferred embodiment of the invention, the ammonium halide and the phosphorus oxyhalide are used in excess of the stoichiometrically required amounts. The preferred proportions of reactants are one mole of phosphorus pentahalide to about 1–1.25 moles of ammonium halide and about 2–2.5 moles of phosphorus oxyhalide.

For carrying out the reaction between $PNX_2 \cdot POX_3$ and phosphorus pentahalide, one mole of the former is reacted with at least two moles of the latter, with 2–2.5 moles being preferred.

The compounds of the class represented by the structural formula $PNX_2 \cdot 2PX_5$, in which X is a halogen, are useful in the preparation of organic phosphorus compounds used as insecticides, flame retardants for textiles, lubricating oil additives, corrosion inhibitors, and plasticizers for plastic sheet and film. For example, the alkyl ester derivatives of $PNX_2 \cdot 2PX_5$ in which the halogens X are replaced by alkoxy groups, such as ($-OCH_3$) or ($-OC_2H_5$), are useful as insecticides. The $$PNCl_2 \cdot 2PCl_5$$

compound is useful as a setting agent for both inorganic and organic-type corrosion resistant cements, i.e. sodium silicate cements and phenol-formaldehyde condensation products.

The practice of this invention is illustrated in the following examples, in which the parts are by weight.

Example 1

49 parts of $PCl_5$, 15 parts of $NH_4Cl$ and 36 parts of $POCl_3$ were charged to a reaction vessel. The reactants were stirred and heated rapidly to about 55° C., at which temperature HCl began to evolve. The reaction mass was heated to about 80° C. and maintained at 80–90° C. during the remainder of the reaction. Heating was continued until evolution of HCl stopped.

200 parts of sym-tetrachloroethane were added to the reactor to leach out the products of the reaction, and the unreacted $PCl_5$ and $POCl_3$, from the unreacted $NH_4Cl$. The solution thus obtained was filtered. The filtrate was heated to evaporate the solvent and the $PCl_5$ and $POCl_3$, using vacuum. A mass of white crystals was recovered. The crystals were redissolved in hot sym-tetrachloroethane. On cooling of the solvent, $$PNCl_2 \cdot 2PCl_5$$

was recovered in the form of white needle-like crystals. A nearly quantitative yield of $PNCl_2 \cdot 2PCl_5$, based on $PCl_5$ used, was obtained. Analysis of the $PNCl_2 \cdot 2PCl_5$ gave 18% phosphorus (theory 17.5%), 2.8% nitrogen (theory 2.6%), and 77.5% chlorine (theory 79.9%). An infrared spectrum of the product was prepared. On heating, the crystals of $PNCl_2 \cdot 2PCl_5$ began to turn yellow at 150° C. but did not melt. Above 200° C. decomposition was observed to begin, becoming very rapid at 275° C.

The $PNCl_2 \cdot 2PCl_5$ reacts violently with water and methanol. It was found to be soluble in halogenated hydrocarbons, e.g., sym-tetrachloroethane. It was found to be insoluble in warm benzene and diethyl ether.

Example 2

36 parts of $PCl_5$, 11 parts of $NH_4Cl$ and 36 parts of $POCl_3$ were reacted as described in Example 1. The reacted mass was leached with about 200 parts of hot sym-tetrachloroethane. The solution was filtered and the solvent was evaporated from it. The mass left in the evaporation vessel was then heated under vacuum to remove residual traces of solvent, $POCl_3$ and $PCl_5$. On further heating, at 120–125° C. at 2–3 mm. Hg pressure, a small amount of colorless liquid distilled off. This liquid solidified at room temperature. Its infrared spectrum was found to be identical with that of a sample of $PNCl_2 \cdot POCl_3$ prepared by the method described by E. Jack Kahler in copending application Ser. No. 565,794 filed Feb. 16, 1956, now Patent No. 2,925,320.

The residue in the distillation flask was identified as $PNCl_2 \cdot 2PCl_5$.

Example 3

49 parts of $PCl_5$, 15 parts of $NH_4Cl$ and 36 parts of $POCl_3$ were mixed with about 195 parts of sym-tetrachloroethane. The reactant mass was stirred and heated. Evolution of HCl gas began at about 85° C. and became rapid at 110° C. The reaction mass was kept at 85–110° C. for about 36 hours without completing the evolution of HCl gas.

White needle-like crystals of product, identified as $PNCl_2 \cdot 2PCl_5$, were recovered from the reaction mass.

Example 4

39 parts of $PNCl_2 \cdot POCl_3$ and 61 parts of $PCl_5$ were reacted in a vessel with stirring at 85–100° C. for about six hours. The reaction mass was distilled under 2 mm. vacuum. Most of the unreacted $PCl_5$ and $PNCl_2 \cdot POCl_3$, as well as $POCl_3$ which had formed in the reaction, was thus removed. The residue in the distillation vessel was dissolved in sym-tetrachloroethane and white needle-like crystals of $PNCl_2 \cdot 2PCl_5$ were obtained (a yield of 67% based on $PNCl_2 \cdot POCl_3$). Identity of the product was confirmed by infrared spectrum to be the same as that of the $PNCl_2 \cdot 2PCl_5$ product made in Example 1.

Following procedures as described in the above examples, $PNBr_2 \cdot 2PBr_5$ can be prepared from $PBr_5$, $POBr_3$ and $NH_4Br$; $PNI_2 \cdot 2PI_5$ can be prepared from $PI_5$, $POI_3$ and $NH_4I$; and $PNF_2 \cdot 2PF_5$ can be prepared from $PF_5$, $POF_3$ and $NH_4F$.

Many widely different embodiments of this invention may be made without departing from the scope and spirit of it, and it is to be understood that our invention includes also such embodiments and is not to be limited by the above description.

We claim:

1. A new composition of matter having the structural formula $PNX_2 \cdot 2PX_5$, in which X is a halogen.
2. $PNCl_2 \cdot 2PCl_5$.
3. A process for the production of $PNX_2 \cdot 2PX_5$, in which X is a halogen, comprising reacting a phosphorus pentahalide with an ammonium halide in the presence of a phosphorus oxyhalide.
4. A process for the production of $PNCl_2 \cdot 2PCl_5$ comprising reacting phosphorus pentachloride with ammonium chloride in the presence of phosphorus oxychloride.
5. A process for the production of $PNX_2 \cdot 2PX_5$, in which X is a halogen, comprising reacting $PNX_2 \cdot POX_3$, in which X is a halogen, with a phosphorus pentahalide.
6. A process for the production of $PNCl_2 \cdot 2PCl_5$ comprising reacting $PNCl_2 \cdot POCl_3$ with phosphorus pentachloride.
7. A process for the production of $PNX_2 \cdot 2PX_5$, in which X is a halogen, comprising reacting a phosphorus pentahalide with an ammonium halide and a phosphorus oxyhalide in the proportions of about three moles of phosphorus pentahalide to at least one mole of ammonium halide to at least one mole of phosphorus oxyhalide at a temperature in the range from about 50° to about 120° C. and recovering $PNX \cdot 2PX_5$ from the reaction mass.
8. A process for the production of $PNCl_2 \cdot 2PCl_5$ comprising reacting phosphorus pentachloride with ammonium chloride and phosphorus oxychloride in the proportions of about three moles of phosphorus pentachloride to at least one mole of ammonium chloride to at least one mole of phosphorus oxychloride at a temperature in the range from about 50° to about 120° C. and recovering $PNCl_2 \cdot 2PCl_5$ from the reaction mass.
9. A process for the production of $PNCl_2 \cdot 2PCl_5$ comprising reacting phosphorus pentachloride with ammonium chloride and phosphorus oxychloride in the proportions of about one mole of phosphorus pentachloride with about 1–1.25 moles of ammonium chloride and about 2–2.5 moles of phosphorus oxychloride at a temperature in the range 80–100° C. and recovering $$PNCl_2 \cdot 2PCl_5$$

from the reaction mass by extraction with a chlorinated hydrocarbon solvent and recovering $PNCl_2 \cdot 2PCl_5$ from the solvent solution.

10. A process according to claim 9 in which the chlorinated hydrocarbon solvent is sym-tetrachloroethane.

11. A process for the production of $PNX_2 \cdot 2PX_5$ in which X is a halogen, comprising reacting $PNX_2 \cdot POX_3$ in which X is a halogen, with phosphorus pentahalide in the proportion of one mole of $PNX_2 \cdot POX_3$ to at least two moles of phosphorus pentahalide in the temperature range from about 50° to about 120° C. and recovering $PNX_2 \cdot 2PX_5$ from the reaction mass.

12. A process for the production of $PNCl_2 \cdot 2PCl_5$ comprising reacting $PNCl_2 \cdot POCl_3$ with phosphorus pentachloride in the proportion of one mole of $PNCl_2 \cdot POCl_3$ to at least two moles of phosphorus pentachloride at a temperature in the range from about 50° to 120° C. and recovering $PNCl_2 \cdot 2PCl_5$ from the reaction mass.

13. A process for the production of $PNCl_2 \cdot 2PCl_5$ comprising reacting $PNCl_2 \cdot POCl_3$ with phosphorus pentachloride in the proportion of one mole of $PNCl_2 \cdot POCl_3$ to 2–2.5 moles of phosphorus pentachloride at a temperature of 80–100° C. and recovering $PNCl_2 \cdot 2PCl_5$ from the reaction mass by extraction with a chlorinated hydrocarbon solvent and recovering $PNCl_2 \cdot 2PCl_5$ from the solvent solution.

References Cited in the file of this patent

Mellor: "Comprehensive Treatise on Inorganic and Theoretical Chemistry," Longmans, Green and Co., New York 1928, vol. 8 page 722.

Besson et al.: "Sur le Chlorazoture de Phosphore," Comptes Rendus Tome 143, July–December 1906, page 38.

"Nomenclature of the Nitrogen Compounds of Phosphorus and of Sulfur," by L. F. Audrieth et al., Chemical Reviews, vol. 32, February 1943, pp. 109–33, page 114 relied on.

Stokes: "American Chemical Journal," vol. 19, p. 786 (1897).

Systematic Inorganic Chemistry" (Yost and Russell), published by Prentice Hall, Inc., N.Y., 1944, pages 108–9.

H. N. Stokes: "On the Chloronitrides of Phosphorus," American Chemical Journal, vol. 19 (1897), page 785 relied on.